United States Patent [19]

Vengrofski

[11] 4,002,494
[45] Jan. 11, 1977

[54] VENT PLUG

[75] Inventor: Frank A. Vengrofski, Rockledge, Pa.

[73] Assignee: ESB Incorporated, Philadelphia, Pa.

[22] Filed: July 17, 1975

[21] Appl. No.: 596,900

[52] U.S. Cl. .............................................. 429/89
[51] Int. Cl.² ......................................... H01M 2/00
[58] Field of Search ............................ 136/177, 163

[56] References Cited
UNITED STATES PATENTS 2,994,731   8/1961   Buskirk et al. ..................... 136/177

FOREIGN PATENTS OR APPLICATIONS 770,701   9/1934   France ............................... 136/163
312,810   6/1929   United Kingdom ............... 136/163
521,084   5/1940   United Kingdom ............... 136/177

Primary Examiner—Donald L. Walton
Attorney, Agent, or Firm—Anthony J. Rossi

[57] ABSTRACT

An annular skirt is provided on a storage battery vent plug to eliminate the formation of current conducting electrolyte paths orginating at the interior of the battery and terminating at a point of differing electrical potential on the exterior of the battery.

4 Claims, 2 Drawing Figures

U.S. Patent  Jan. 11, 1977  4,002,494

VENT PLUG

BACKGROUND OF THE INVENTION

This invention relates to vent plugs for storage or secondary cells or batteries. More particularly, it relates to vent plugs for eliminating the formation of current conducting electrolyte paths originating at the interior of such cells and terminating at a point on the exterior of the battery having an electrical potential differing substantially from that of the originating point of the electrolyte path.

It may be explained here that typically a rubber gasket is located between the vent plug and the filler or vent neck located at the top of the vent well of a cell or battery. This rubber gasket is provided to form a liquid-tight seal between the vent plug and the vent neck of the battery. Eventually, however, both the upper and lower surfaces of the rubber gasket become wet with electrolyte. This may be caused, for example, during charging of the battery as the electrolyte is agitated and bubbles are formed which upon bursting splash up through the vent well to wet the rubber gasket. As the rubber gasket becomes wet with electrolyte, the electrolyte creeps along the surfaces of the rubber gasket until eventually an electrically conductive current carrying path is established from the plates or element of the cell, the surfaces of the vent well, across the rubber gasket, across the top of the cover of the cell and ultimately to a point or points exterior of the cell of electrical potential differing substantially from that of the originating point of the path so formed, e.g., terminating at an intercell connecter, terminal or metal tray holding the battery.

These electrical paths, formed by such electrolyte creepage, can eventually cause damage to the cell or battery due to electrical shorting of the cell and even result in sparks being generated which may possibly cause fires and explosions.

These potential problems are magnified in multi-cell batteries because of the higher voltages thereof effecting a larger flow of current through such established electrolyte paths. These higher currents can result in large amounts of heat being generated to effect localized combustion of the battery case.

Therefore, in view of the above, a primary object of the invention is to provide vent plugs which prevent the formation of electrically conductive electrolyte leakage paths originating at interior of a cell and terminating at a point of different electrical potential on the surface of the battery.

This and other objects and advantages of the invention will become apparent hereinafter from the following detailed description of the invention.

SUMMARY OF THE INVENTION

In the broadest aspect of this invention, there is provided a storage battery vent plug for eliminating the formation of current conducting electrolyte paths originating at the interior of a cell and terminating at a point of different electrical potential on the surface of the cell. The vent plug includes a barrel portion having means for securing the vent plug in the annular filler neck of a battery and a sealing portion for providing a seal between the vent plug and the filler neck of a battery. The sealing portion includes an annular skirt which is constructed and arranged to depend from the vent plug and concentrically surround the filler neck of a battery with the inner surface thereof being spaced from the outer surface of the filler neck.

DESCRIPTION OF THE PREFERRED EMBODIMENTS

Figure 1:
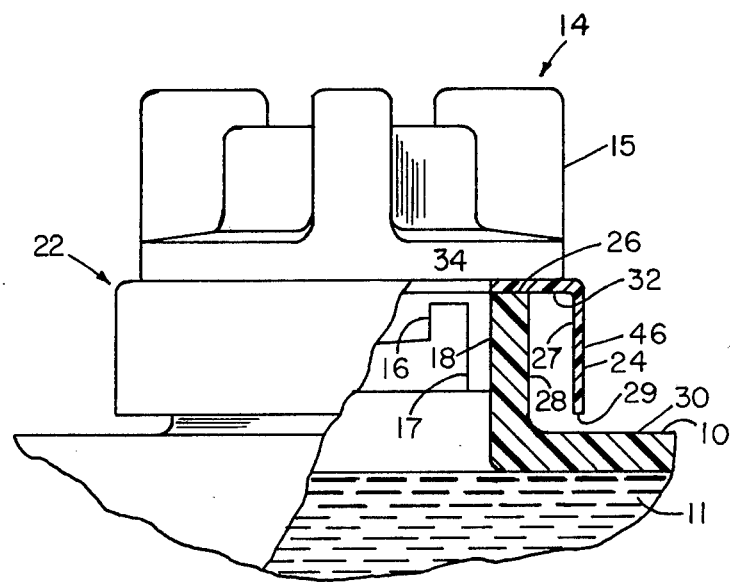
FIG. 1 is a view partly in section illustrating the vent plug in accordance with the invention in place on a partly shown battery.

Referring now to the drawings wherein like reference numerals refer to like parts throughout the drawings, 10 designates a storage or secondary cell container cover which is conventional and 11 designates the normal electrolyte of the cell. The cover 10 includes an upstanding annular vent or filler neck 12 which is adapted to accommodate a vent plug shown generally at 14. The vent plug 14 has a hooded portion 15 and a suitable bayonet type lug 16 integrally formed on barrel portion 17 thereof which is adapted to mate with a complementary bayonet type lug (not shown) integrally formed on the inside surface 18 of filler neck 12. The vent plug 14 may, of course, be provided with a screw-threaded barrel which would screw into the filler neck 12 which, of course, would then be provided with complementary receiving threads. The vent plug 14 is provided with suitable baffling to prevent the escape of electrolyte while permitting the escape of gases through a vent hole. Both of these features are provided in hooded portion 15, but neither has been illustrated.

In accordance with the invention, an inverted cup shaped member or gasket, shown generally at 22, is provided over the filler neck 12. The gasket 22 has an annular skirt 24 which depends below the top surface 26 of the filler neck 12 and concentrically surrounds the filler neck 12. The inside vertical surface 27 of skirt 22 is spaced from vertical surface 28 of neck 12. The lower edge 29 of the skirt 24 is spaced from the top surface 30 of the cell cover 10. The gasket 22 also includes an inwardly flanged portion 32 from which skirt 24 depends. Flange portion 32 is positioned on the top surface 26 of filler neck 12 and concentrically surrounds the barrel portion 16 of vent plug 14.

In practice, the gasket 22 is fitted onto barrel portion 17 of vent plug 14 via the opening 34 provided in the gasket 22 and the entire assembly is then secured to the vent neck 12 via the mating bayonet lugs.

Figure 2:
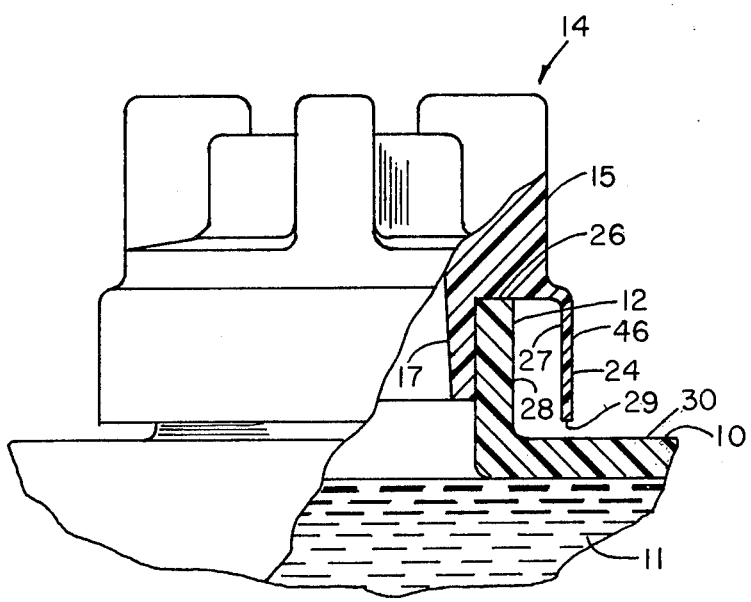
FIG. 2 is a view similar to FIG. 1 of an alternate embodiment of the vent plug in accordance with the invention.

It should be understood that while the vent plug 14 and cup-shaped member 22 have been illustrated in FIG. 1 as two distinct parts, they may be formed together as a unitary structure or as integral members, as for example, by suitable injection molding techniques. Such a construction is shown in FIG. 2. In this latter instance, the vent plug 14 comprises any suitable hooded portion 15 having suitable vent openings therein, a barrel portion 17 and an annular skirt constructed and arranged to depend from the vent plug and concentrically surround the filler neck 12 with the inner surface 27 thereof being spaced from the vertical surface 28 of filler neck 12.

Any material that is acid resistant, flexible or pliable enough to serve as seal between the vent plug 14 and vent neck 12 and that does not wet readily with acid is suitable for fabricating the vent plug or cup shaped gasket 22 of the invention, e.g., teflon, polypropylene and polyethylene. Polyethylene is preferred.

Surprisingly, it has been found that use of the gasket of the invention eliminates the problems of electrolyte leakage from the interior of the battery and it has been found that electrolyte creepage does not occur on the inside vertical surface 27 or outside vertical surface 46 of annular skirt 24. Thus, the vent plug or gasket of the invention eliminates the problems caused by the formation of current conducting electrolyte paths originating at the interior of cells and terminating at a point or points of different electrical potential on the exterior of the cell.

Having thus described my invention, I claim:

1. In a storage battery comprising:
   a. a container;
   b. a cover for the container;
   c. an electrolyte within the container;
   d. a vent well formed in the cover, the vent well providing access from outside the container to the interior thereof, the vent well including an upstanding annular filler neck raised above the outside surface of the cover, and;
   e. a vent plug having means for securing it in said filler neck, the improvement comprising means for eliminating the formation of current conducting electrolyte paths resulting from electrolyte creepage originating at a point in the interior of the battery and terminating at a point exterior of the battery and having an electrical potential different from said originating point, said means comprising a one piece gasket cooperating with portions of the vent plug and being sealingly disposed between the top surface of said filler neck and said portions of the vent plug, said gasket being further defined as having an inwardly flanged skirt, the flange of said skirt being positioned on said top surface of said filler neck and the skirt thereof depending from the flange and concentrically surrounding said filler neck with the inner surface of said skirt spaced from the outer surface of said filler neck, the lower edge portion of said skirt being spaced from the upper surface of the cover for the container.

2. In a storage battery as defined in claim 1 wherein said storage battery is a multi-cell battery.

3. In a storage battery as defined in claim 1 wherein said gasket is fabricated of polyethylene.

4. In a storage battery as defined in claim 2 wherein said gasket is fabricated of polyethylene.

* * * * *